United States Patent [19]

Kubota

[11] Patent Number: 5,254,416
[45] Date of Patent: Oct. 19, 1993

[54] ELECTRON CONDUCTIVE HIGH POLYMER

[75] Inventor: Tadahiko Kubota, Kanagawa, Japan

[73] Assignee: Fuji Photo Film Co., Ltd., Kanagawa, Japan

[21] Appl. No.: 818,287

[22] Filed: Jan. 9, 1992

[30] Foreign Application Priority Data

Jan. 24, 1991 [JP] Japan .................. 3-022611

[51] Int. Cl.⁵ .................. H01M 4/60; C08G 75/00
[52] U.S. Cl. .................. 429/213; 528/380; 528/417; 528/423
[58] Field of Search .................. 429/213; 528/380, 417, 528/423

[56] References Cited

U.S. PATENT DOCUMENTS

| | | | |
|---|---|---|---|
| 4,543,306 | 9/1985 | Dubois et al. | 429/213 X |
| 4,781,443 | 11/1988 | Giles | 528/380 X |
| 4,795,687 | 1/1989 | Suzuki et al. | 528/423 X |
| 4,880,508 | 11/1989 | Aldissi | 528/380 X |
| 4,987,042 | 1/1991 | Jonas et al. | 429/213 |

*Primary Examiner*—Stephen Kalafut
*Attorney, Agent, or Firm*—Sughrue, Mion, Zinn, Macpeak & Seas

[57] ABSTRACT

An electron conductive high polymer is described, having at least a repeating unit represented by following formula (1);

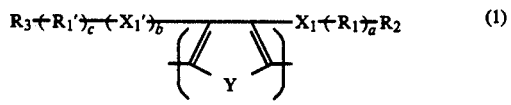

wherein $X_1$ and $X_1'$ each represents a divalent linkage group; $R_1$ and $R_1'$ each represents an alkylene group; $R_2$ represents a cyclic ester derivative group, an acyclic ester derivative group, a cyclic ether derivative group, or a sulfone derivative group; $R_3$ represents a hydrogen atom, an alkyl group, an aryl group, a cyclic ester derivative group, an acyclic ester derivative group, a cyclic ether derivative group, or a sulfone derivative group; a, b, and c each represents 0 or 1; and Y represents —$NR_4$—, —O—, —S—, —Te—, or —Se—wherein $R_4$ represents a hydrogen atom, an alkyl group, or an aryl group. A positive electrode for battery using the electron conductive high polymer is also described.

12 Claims, 1 Drawing Sheet

ELECTRON CONDUCTIVE HIGH POLYMER

FIELD OF THE INVENTION

The present invention relates to an electron conductive high polymer applicable as an antistatic material for plastic films and as electric conductive materials in the fields of electric and electronics industries, such as batteries, condensers, electrochromic elements, etc.

BACKGROUND OF THE INVENTION

With regard to an organic high polymer material having an electron conductivity, the applications thereof for batteries and various functional devices have recently been investigated. For example, polyaniline as described in JP-A-2-638 (the term "JP-A" as used herein means an "unexamined published Japanese patent application"), polypyrrole as described in JP-A-62-226568, polyacene as described in JP-A-63-301465, etc., has been regarded as hopeful electron conductive high polymers. These electron conductive high polymers can be produced by an electrolytic polymerization method or a chemical oxidation polymerization method.

However, the electrolytic polymerization method has problems on the mass producing property and the cost in the points that (1) the producing amount is restricted by the size of an electrode, (2) a step of separating the polymerized product from the electrode is required, etc.

Also, the capacity of a battery in the case of using polyaniline or polypyrrole as the electrode of the battery was low as 5.6 wh/kg for polyaniline and 8.2 wh/kg for polypyrrole [*Kagaku to Kogyo* (*Chemistry and Industry*), Vol. 42, No. 9, p. 1560 (1989)].

In regard to this point, it has been investigated to improve the capacity by carrying out the electrolytic polymerization of polypyrrole through a nitrile-butadiene rubber and thereafter cleaning the nitrile-butadiene rubber to thereby increase the utilizable active points in the polypyrrole film [Oosaka et al, *Journal of the Electrochemical Society*, Vol. 134, p. 2479 (1987)] but such a polypyrrole film is unsuitable for practical use in the points of the producibility and the cost since the production method thereof is an electrolytic polymerization.

Also, when the product obtained by electrolytically polymerizing a pyrrole having a 3,6,9-trioxadecyl group at the N-position was used as the electrode for a battery in the system of using a high polymer solid electrolyte of polyethylene oxide, the capacity thereof was from twice to 30 times that in the case of using an unsubstituted polypyrrole but such a product was inferior in the repeating characteristics [M. G. Menet et al, *Synthetic Metals*, Vol. 28, p. C 211 (1989)].

SUMMARY OF THE INVENTION

The object of this invention is, therefore, to provide an electron conductive high polymer having improved capacity as compared to conventional electron conductive high polymers and being excellent in the charging and discharging repeating characteristics.

It has now been discovered that the foregoing object can be achieved by the present invention as described hereinbelow.

That is, according to the present invention, there is provided an electron conductive high polymer having at least a repeating unit represented by following formula (1);

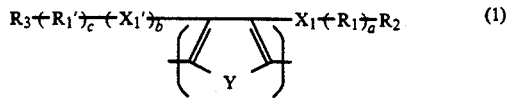

wherein $X_1$ and $X_1'$ each represents a diva group; $R_1$ and $R_1'$ each represents an alkylene group; $R_2$ represents a cyclic ester derivative group, an acyclic ester derivative group, a cyclic ether derivative group, or a sulfone derivative group; $R_3$ represents a hydrogen atom, an alkyl group, an aryl group, a cyclic ester derivative group, an acyclic ester derivative group, a cyclic ether derivative group, or a sulfone derivative group; a, b, and c each represents 0 or 1; and Y represents $-NR_4-$, $-O-$, $-S-$, $-Te-$, or $-Se-$ wherein $R_4$ represents a hydrogen atom, an alkyl group, or an aryl group.

DETAILED DESCRIPTION OF THE INVENTION

Figure 1:
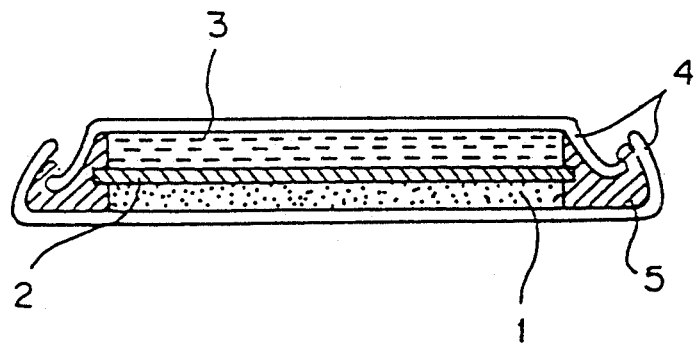
FIG. 1 is a cross sectional view of a coin type battery used in Examples 16 to 27 and Comparison Examples 1 and 2.

Then, this invention is described in detail.

First, a compound which the repeating unit shown by foregoing formula (1) is derived from (hereinafter, a compound shown by formula (1)) is explained in detail.

In formula (1), $X_1$ represents a divalent linkage group and is preferably $-C(O)O-$, $-C(O)NR_5-$, $-CH_2O-$, $-(O)S(O)-$, $-C(O)-$, or $-C(O)CH_2O-$ (wherein $R_5$ represents a hydrogen atom, or an alkyl group having from 1 to 3 carbon atoms, and is preferably a hydrogen atom, or a methyl group) $X_1$ is particularly preferably $-C(O)O-$, $-CH_2O-$, $-C(O)-$, or $-C(O)CH_2O-$. $X_1'$ has the same meaning as $X_1$.

In formula (1), $R_1$ represents an alkylene group, preferably an alkylene group having from 1 to 10 carbon atoms, more preferably an alkylene group having from 1 to 5 carbon atoms, and particularly preferably an alkylene group having from 1 to 3 carbon atoms. $R_1'$ has the same meaning as $R_1$.

In formula (1), $R_2$ represents a cyclic ester derivative group, an acyclic ester derivative group, a cyclic ether derivative group, or a sulfone derivative group, preferably is a 5- to 7-membered ring cyclic carbonic acid ester group, an acyclic carbonic acid ester group having from 2 to 7 carbon atoms inclusive of a carbon atom of a carbonyl group thereof, an ester group having from 2 to 7 carbon atoms inclusive of a carbon atom of a carbonyl group thereof, a 5- to 7-membered ring lactone group, a 3- to 12-membered ring cyclic ether group, or $-(O)S(O)R_6$ (wherein $R_6$ represents a methyl group, an ethyl group, a propyl group inclusive of an isopropyl group), more preferably is a 5- to 7-membered ring cyclic carbonic acid ester group, $-OC(O)OCH_3$, $-OC(O)OC_2H_5$, $-OC(O)OC_3H_7$, $-OC(O)CH_3$, $-OC(O)C_2H_5$, $-OC(O)C_3H_7$, a 5- to 7-membered ring lactone group, a 3- to 12-membered ring cyclic ether group, $-(O)S(O)CH_3$, $-(O)S(O)C_2H_5$, or $-(O)S(O)C_3H_7$, further more preferably a 5- or 6-membered ring cyclic carbonic acid ester group, $-OC(O)OCH_3$, $-OC(O)CH_3$, a 5- or 6-membered ring lactone group, a 3- to 12-membered ring cyclic ether group, or —(O)S-(O)CH₃, and particularly preferably the groups shown below:

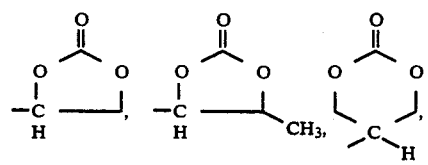

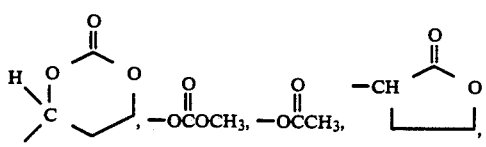

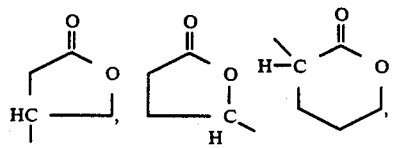

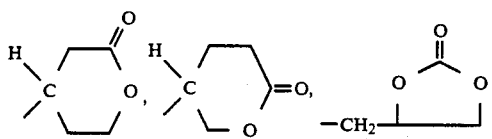

In formula (1), Y represents —NR₄ (wherein R₄ has the same meaning as above), —O—, —S—, —Te—, or —Se—.

R₃ is a hydrogen atom, an alkyl group, an aryl group, a cyclic ester derivative group, an acyclic ester derivative group, a cyclic ether derivative group, or a sulfone derivative group, is preferably a hydrogen atom, an alkyl group having from 1 to 10 carbon atoms, a phenyl group, or each of the groups same as the groups described above as the preferred groups of R₂, is more preferably a hydrogen atom, an alkyl group having from 1 to 5 carbon atoms, a phenyl group, or each of the groups same as the groups described above as the more preferred groups of R₂, and is particularly preferably a hydrogen atom, a methyl group, an ethyl group, a phenyl group, or each of the groups as those described above as the particularly preferred groups of R₂.

R₄ is a hydrogen atom, an alkyl group or an aryl group, preferably is a hydrogen atom, an alkyl group having from 1 to 10 carbon atoms, or an aryl group, more preferably a hydrogen atom, an alkyl group having from 1 to 5 carbon atoms, or a phenyl group, and particularly preferably a hydrogen atom, a methyl group, an ethyl group, or a phenyl group. Also, a, b, and c each represents 0 or 1.

Then, specific examples of the monomers of the compounds shown by formula (1) being used in this invention are illustrated below but this invention is not limited to these monomers.

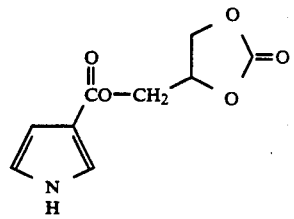 I-1

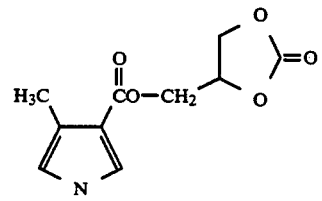 I-2

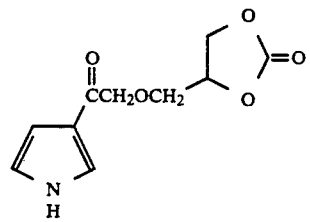 I-3

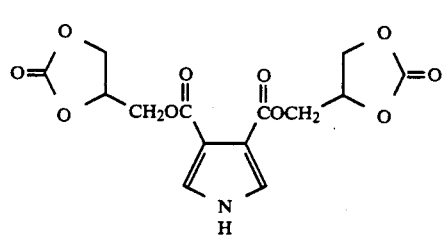 I-4

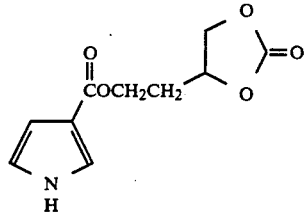 I-5

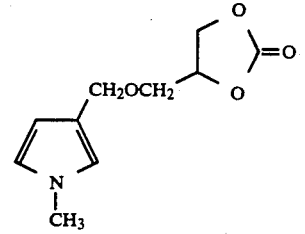 I-6

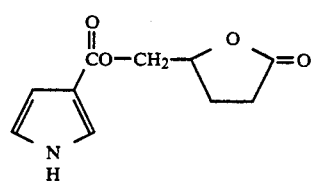 I-7

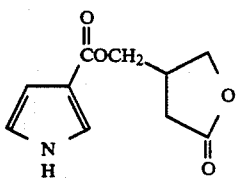
I-8

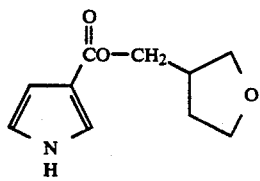
I-9

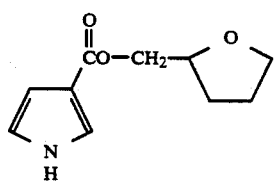
I-9a

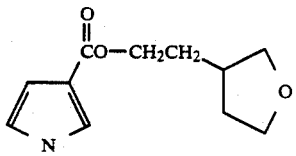
I-10

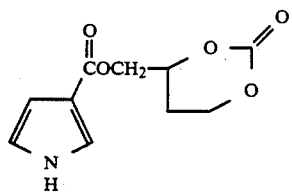
I-11

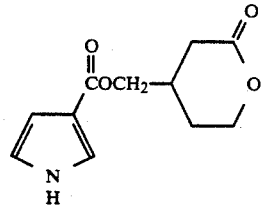
I-12

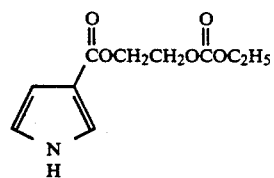
I-13

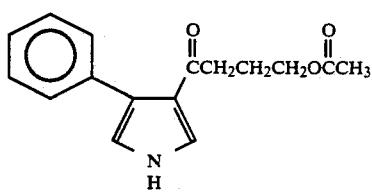
I-14

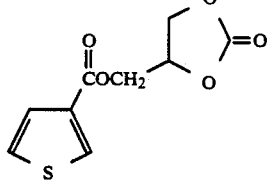
I-15

For polymerizing the foregoing compound shown by formula (1) in this invention, a method of electrochemically oxidative polymerizing it in a solution (electrolytic oxidation polymerization method) and a method of oxidative polymerizing it by reacting it with an oxidizing agent in a solution (chemical oxidation polymerization) can be used.

For the chemical oxidation polymerization method, a known chemical oxidation polymerization method as described, for example, in U.S. Pat. No. 4,615,829 can be used. The high polymer by a chemical oxidation polymerization can be obtained by dissolving or dispersing the compound shown by formula (1) in an optional organic solvent and gradually adding dropwise a solution of a catalyst (oxidizing agent) to the solution or dispersion at a temperature of −20° C. to 30° C., and preferably from 0° C. to 20° C.

As the catalyst which is used for the chemical oxidation polymerization, any catalysts which can oxidize the compound shown by formula (1) can be used. For example, there are chlorides of iron, aluminum, tin, manganese, titanium, zirconium, chromium, molybdenum, tungsten, ruthenium, platinum and palladium, and metal catalysts of $BF_4$, $PF_6$, etc. Specific examples of these catalysts are ferric chloride, stannic chloride, molybdenum chloride, tungsten chloride, $Fe(BF_4)_3$, $Fe(PF_6)_3$, luthenium trichloride, etc. Also, quinones such as benzoquinone, halogens such as iodine, bromine, etc., potassium ferricyanide, etc., can be used as the catalyst.

The amount of the catalyst changes according to the properties of the compound of formula (1) being used and the kind of the catalyst but the ratio of the catalyst/the compound of formula (1) for use in this invention is in the range of, preferably from 0.01 to 10, more preferably 0.1 to 10, and particularly preferably 1 to 5, by mol.

Also, at the polymerization of the compound of formula (1), the compound may be polymerized using an electric conductive salt together. As the electric conductive salt which can be used, there are salts including the salt of an alkali metal cation ($Li^+$, $Na^+$, $K^+$, etc.), $NO^+$, $NO_2^+$, or an onium cation ($Et_4N^+$, $Bu_4N^+$, $Bu_3P^+$, etc.) and an anion ($BF_4^-$, $AsF_6^-$, $SbF_6^-$, $SbCl_6^-$, $PF_6^-$, $ClO_4^-$, $AlF_4^-$, $NiF_4^{2-}$, $ZrF_6^{2-}$, $TiF_6^{2-}$, $B_{10}Cl_{10}^{2-}$, $HSO_4^-$, $SO_4^{2-}$, $Cl^-$, $Br^-$, $F^-$, an anthraquinonesulfonic acid anion, etc.); salts including carboxylic acid anions such as HCOOLi, sodium polyacrylate, etc.; chlorides such as $FeCl_3$, etc.; and organic amine salts such as pyridine hydrochloride, etc.

The ratio of the electric conductive salt which can be used for the chemical oxidation polymerization method/the compound of formula (1) for use in this invention is in the range of, preferably 0.01 to 5, more preferably 0.1 to 4, and particularly preferably 0.1 to 2, by mol.

The high polymer by an electrolytic oxidation polymerization method as described, for example, in U.S. Pat. No. 4,468,291 can be obtained by dissolving or dispersing the compound shown by formula (1) and an electric conductive salt in an organic solvent capable of dissolving the electric conductive salt, immersing a positive electrode and a negative electrode in the solution or the dispersion, and forming the high polymer by a constant voltage method, a constant potential method, or a constant electric current method at a temperature of from −20° C. to 80° C., and preferably from 0° C. to 30° C. The constant voltage method is preferred.

At the electrode materials which can be used for the electrolytic oxidation polymerization method, there are metal electrodes (e.g., Au, Pt, Ni, Cu, Sn, and Zn), carbon electrodes (e.g., glassy carbon), metal oxide electrodes (e.g., $SnO_2$ and $In_2O_3$), etc. Also, a reference electrode (e.g., saturated calomel electrode) is preferably used in addition to the foregoing electrodes.

As the electric conductive salt which can be used for the electrolytic oxidation polymerization method, there are salts of alkali metal cations ($Li^+$, $Na^+$, $K^+$, etc.), $NO^+$, $NO_2^+$, or onium cations ($Et_4N^+$, $Bu_4N^+$, $Bu_3P^+$, etc.) and anions ($BF_4^-$, $AsF_4^-$, $AsF_6^-$, $SbF_6^-$, $SbCl_6^-$, $PF_6^-$, $ClO_4^-$, $AlF_4^-$, $AlF_6^-$, $NiF_4^{2-}$, $ZrF_6^{2-}$, $TiF_6^{2-}$, $B_{10}Cl_{10}^{2-}$, $HSO_4^-$, $SO_4^{2-}$, $Cl^-$, $Br^-$, $F^-$, etc.); salts including sulfonic acids anions ($CH_3C_6H_4SO_3^-$, $C_6H_5SO_3^-$, $CF_3SO_3^-$, anthraquinonesulfonic acid anions, polystyrene-sulfonic acid anion, etc.); salts including carboxylic acid anions such as HCOOLi, sodium polyacrylate, etc.; chlorides such as $FeCl_3$, etc.; and organic amine salts such as pyridine hydrochloride, etc.

The ratio of the electric conductive salt which can be used for the electrolytic oxidation polymerization method/the compound of formula (1) for use in this invention is in the range of, preferably 0.01 to 5, more preferably 0.1 to 4, and particularly preferably 0.1 to 2, by mol.

As the solvent which can be used for the chemical oxidation polymerization method and the electrolytic oxidation polymerization method, there are organic solvents (e.g., acetonitrile, dimethylsulfuric acid, N,N-dimethylacetamide, N,N-dimethylformamide, dimethyl sulfoxide, sulforan, formamide, dimethoxyethane, propylene carbonate, γ-butyrolactone, dioxane, methanol, ethanol, nitrobenzene, tetrahydrofuran, and nitromethane) and a mixture of these organic solvents.

As the polymerization method, the chemical oxidation polymerization method which can easily produce a large amount of the high polymer at a lower cost is preferably used.

The electron conductive high polymer of this invention can be obtained by oxidative polymerizing one or more kinds of the compounds shown by formula (1) and at the oxidation polymerization, one or more kinds of monomers other than the compound shown by formula (1) may be used. As the monomer which can be used at the initial stage of the polymerization, there are, for example, compounds represented by following formula (2);

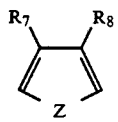
(2)

wherein $R_7$ and $R_8$ each represents a hydrogen atom, an aryl group having from 6 to 12 carbon atoms, or an alkyl group having from 1 to 10 carbon atoms, preferably represents a hydrogen atom, $-C_6H_5$, or an alkyl group having from 1 to 5 carbon atoms, and more preferably represents a hydrogen atom, or an alkyl group having from 1 to 3 carbon atoms; and Z represents a group containing a hetero-atom, and preferably represents $-O-$, $-S-$, $-Se-$, $-Te-$, or $-NR_9-$ (wherein $R_9$ represents a hydrogen atom, an aryl group, or an alkyl group, preferably represents a hydrogen atom, $-C_6H_5$, or an alkyl group having from 1 to 5 carbon atoms, and more preferably represents a hydrogen atom, or an alkyl group having from 1 to 3 carbon atoms).

Then, specific examples of the monomers of the compounds shown by formula (2) being used in this invention are illustrated below but this invention is not limited to these monomers.

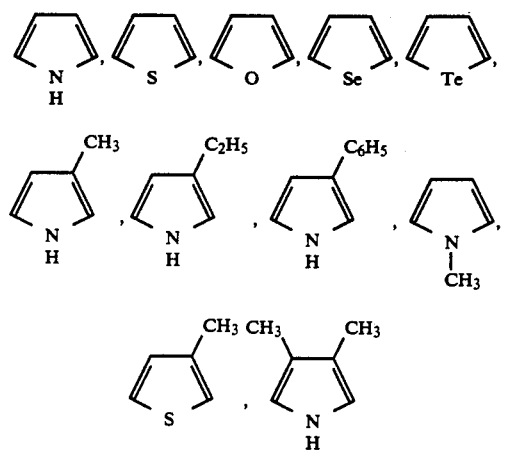

In the case of copolymerizing the compound shown by formula (1) and the heterocyclic compound, they can be copolymerized at any desired mol ratio but it is preferable that the compound of formula (1) is contained in an amount of at least 0.1%, and more preferably at least 1% by mol.

Specific examples of the preferred high polymer for use in this invention are illustrated below but, as the matter of course, this invention is not limited to them. In the following formulae, the ratio of each component is shown by weight percent. The symbol δ shows the electronic conductivity of compound obtained by polymerization in the presence of ferric chloride in an amount of 9 times the mol of monomers.

Compound P-1:

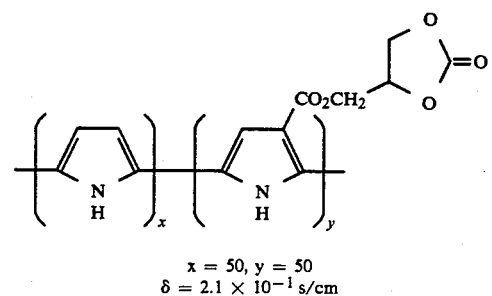

x = 50, y = 50
δ = 2.1 × 10⁻¹ s/cm

Compound P-2: The compound of the formula of compound P-1, wherein x = 70 and y = 30.
δ = 4.6 × 10⁻¹ s/cm Compound P-3: The compound of the formula of compound P-1, wherein x = 90 and y = 10.
$\delta = 7.2 \times 10^{-1}$ s/cm Compound P-4: The compound of the formula of compound P-1, wherein x = 20 and y = 80.
$\delta = 1.9 \times 10^{-1}$ s/cm Compound P-5: The compound of the formula of compound P-1, wherein x = 30 and y = 70.
$\delta = 1.8 \times 10^{-1}$ s/cm Compound P-6:

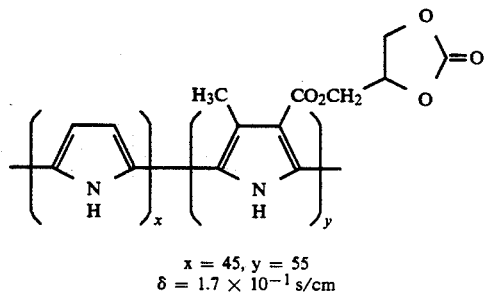

x = 45, y = 55
$\delta = 1.7 \times 10^{-1}$ s/cm

Compound P-7: The compound of the formula of compound P-6, wherein x = 75 and y = 25.
$\delta = 2.2 \times 10^{-1}$ s/cm Compound P-8:

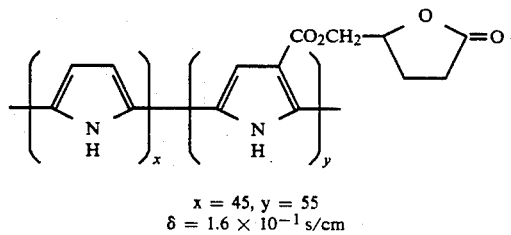

x = 45, y = 55
$\delta = 1.6 \times 10^{-1}$ s/cm

Compound P-9: The compound of the formula of compound P-8, wherein x = 80 and y = 20.
$\delta = 2.1 \times 10^{-1}$ s/cm Compound P-10:

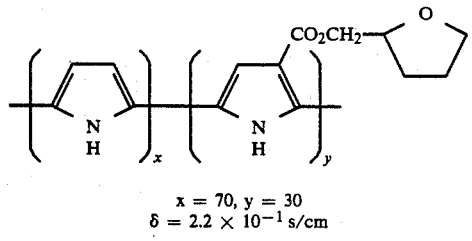

x = 70, y = 30
$\delta = 2.2 \times 10^{-1}$ s/cm

Compound P-11:

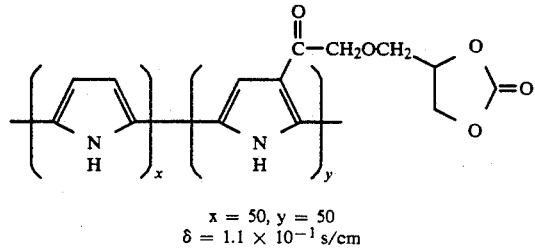

x = 50, y = 50
$\delta = 1.1 \times 10^{-1}$ s/cm

Compound P-12: The compound of the formula of compound P-11, wherein x = 80 and y = 20.
$\delta = 2.9 \times 10^{-1}$ s/cm Compound P-13: The compound of the formula of compound P-11, wherein x = 20 and y = 80.
$\delta = 8.6 \times 10^{-2}$ s/cm Compound P-14:

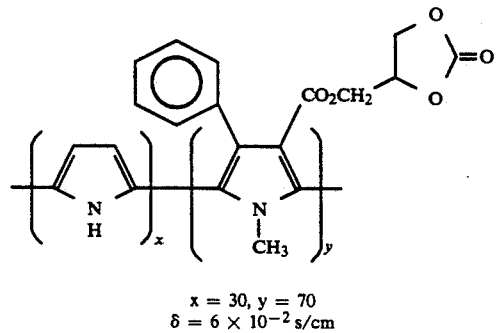

x = 30, y = 70
$\delta = 6 \times 10^{-2}$ s/cm

Compound P-15

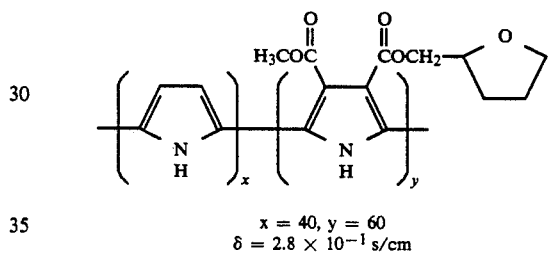

x = 40, y = 60
$\delta = 2.8 \times 10^{-1}$ s/cm

Compound P-16:

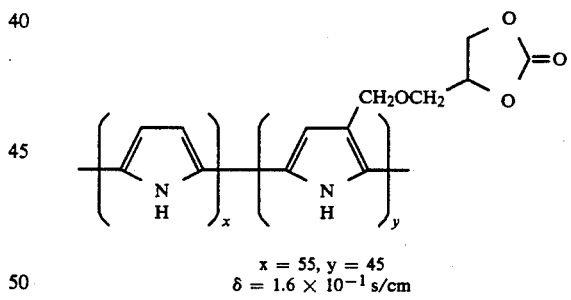

x = 55, y = 45
$\delta = 1.6 \times 10^{-1}$ s/cm

Compound P-17: The compound of the formula of compound P-16, wherein x = 85 and y = 15.
$\delta = 4.9 \times 10^{-1}$ s/cm Compound P-18: The compound of the formula of compound P-16, wherein x = 35 and y = 65.
$\delta = 9.2 \times 10^{-2}$ s/cm Compound P-19

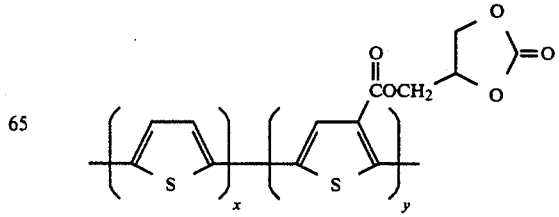

$x = 75, y = 25$
$\delta = 6.6 \times 10^{-2}$ s/cm

Compound P-20: The compound of the formula of compound P-19, wherein $x = 50$ and $y = 50$.
$\delta = 3.9 \times 10^{-2}$ s/cm Compound P-21: The compound of the formula of compound P-19, wherein $x = 25$ and $y = 75$.
$\delta = 1.2 \times 10^{-2}$ s/cm Compound P-22:

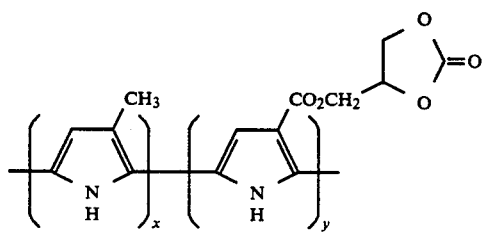

$x = 50, y = 50$
$\delta = 2.0 \times 10^{-1}$ s/cm

Compound P-23:

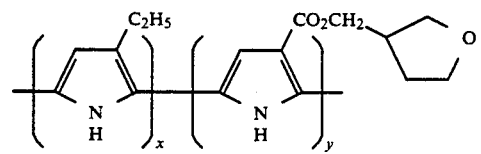

$x = 50, y = 50$
$\delta = 1.5 \times 10^{-1}$ s/cm

Compound P-24:

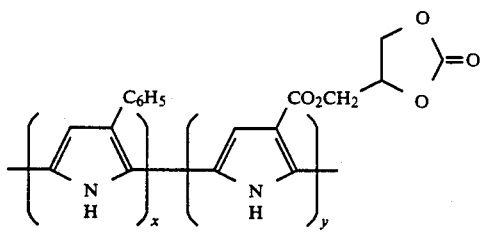

$x = 30, y = 70$
$\delta = 1.1 \times 10^{-1}$ s/cm

Compound P-25:

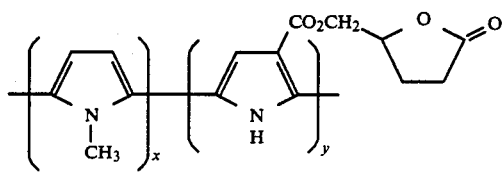

$x = 20, y = 80$
$\delta = 8 \times 10^{-2}$ s/cm

Compound P-26:

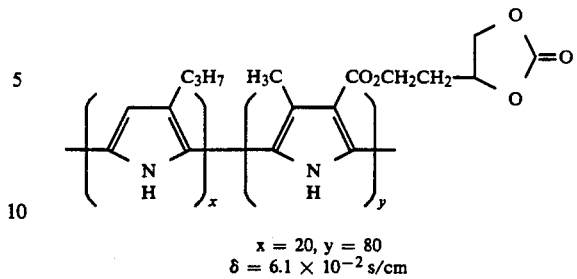

$x = 20, y = 80$
$\delta = 6.1 \times 10^{-2}$ s/cm

Compound P-27:

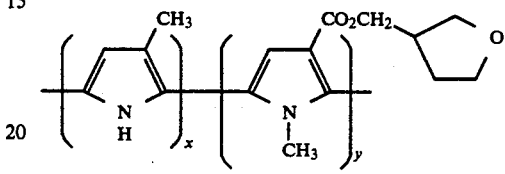

$x = 20, y = 80$
$\delta = 8.4 \times 10^{-2}$ s/cm

Compound P-28:

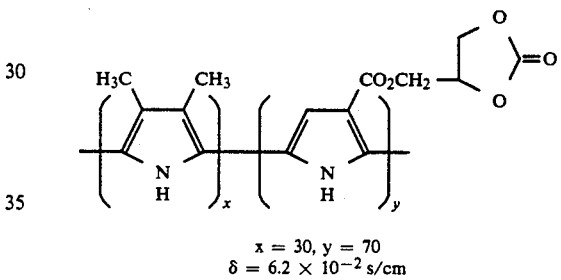

$x = 30, y = 70$
$\delta = 6.2 \times 10^{-2}$ s/cm

Compound P-29:

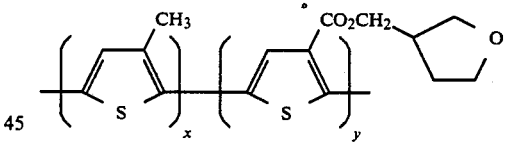

$x = 30, y = 70$
$\delta = 3.5 \times 10^{-2}$ s/cm

Compound P-30:

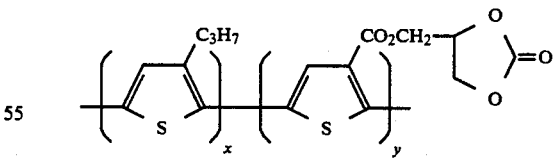

$x = 30, y = 70$
$\delta = 9.2 \times 10^{-3}$ s/cm

Compound P-31:

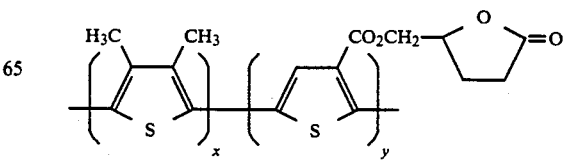

-continued x = 30, y = 70
δ = 1.6 × 10⁻³ s/cm

Compound P-32:

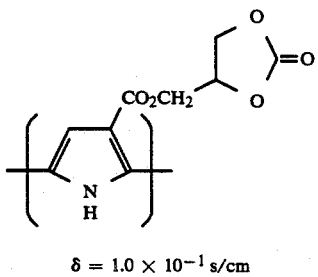

δ = 1.0 × 10⁻¹ s/cm

Compound P-33:

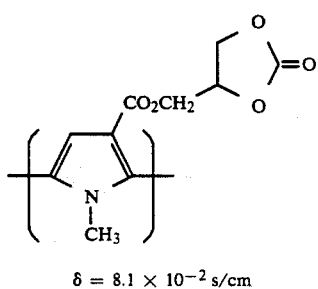

δ = 8.1 × 10⁻² s/cm

Compound P-34:

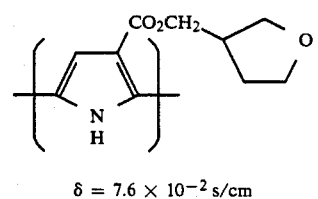

δ = 7.6 × 10⁻² s/cm

Compound P-35:

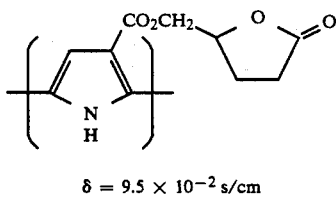

δ = 9.5 × 10⁻² s/cm

Compound P-36:

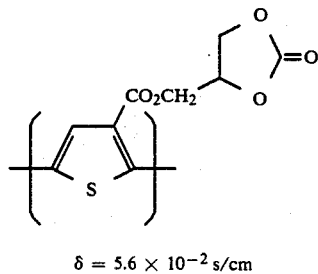

δ = 5.6 × 10⁻² s/cm

Also, in the case of constituting a positive electrode active material for a battery using the electron conductive high polymer of this invention, the electron conductive high polymer can be ground at use. For grinding the high polymer, a known grinding means such as a ball mill, a roll mill, a rotary grinder, grinding by a mortar, etc., can be used. The specific area of the ground electron conductive high polymer particles is preferably from 0.1 m²/g to 1,000 m²/g, more preferably from 0.5 m²/g to 1,000 m²/g, and particularly preferably from 1 m²/g to 1,000 m²/g.

Also, the electron conductive high polymer of this invention can contain an electric conductive material such as carbon etc., and a cementing agent such as Teflon (trade name, made by E. I. du Pont de Nemours & Co., Ltd.), etc.

The electron conductive high polymer of this invention can be used as an electric conductive material for a polymer battery by laminating with a high polymer solid electrolyte. The electron conductive high polymer of this invention may form a plural layers with the same high polymer or with a known other electron conductive high polymer. Also, the electron conductive high polymer of this invention may further form laminated layers with a high polymer solid electrolyte containing a salt of a metal ion of group Ia or group IIa of long form of the periodic table. However, it is preferable that the high polymer solid electrolyte is directly in contact with the electron conductive high polymer of this invention.

The high polymer solid electrolyte layer preferably has a thickness of from 0.1 to 200 μm, and the electron conductive high polymer layer preferably has a thickness of from 0.01 to 2,000 μm.

As the high polymer solid electrolyte capable of obtaining a laminated electric conductive material with the electron conductive high polymer of this invention, there are combinations of a cation polymer, an anion polymer, polyacrylonitrile, a polyalkylene oxide polymer (e.g., polyethylene oxide (PEO), polypropylene oxide (PPO), a silicon compound and phosphasene each containing PEO), polyvinyl alcohol, etc., and salts. Practical examples of these combinations are described in JP-A-61-256573, JP-A-61-124001, JP-A-62-20263, JP-A-62-139266, JP-A-63-241066, JP-A-63-241026, JP-A-63-135477, JP-A-63-142061, JP-A-63-130613, JP-A-60-23974, JP-A-63-136409, JP-A-63-193954, JP-A-63-186766, JP-A-63-205364, and *Micromolecules*, Vol. 21, p. 648.

As the salt for constituting the high polymer solid electrolyte, there are above-described electric conductive salts which are used for the chemical oxidation polymerization method. In these salts, the salts of metal ions of group Ia or group IIa of long form of the periodic table are preferred and Li salts are more preferable. Examples of such Li salts are $LiBF_4$, $LiClO_4$, $LiCF_3SO_3$, $LiPF_6$, and lithium toluenesulfonate.

Also, the high polymer solid electrolyte may contain therein an organic solvent (e.g., propylene carbonate, ethylene carbonate, γ-butyrolactone, dimethoxyethane, methyltetrahydrofuran, tetrahydrofuran, acetonitrile, 1,3-dioxolan, nitromethane, dimethylformamide, and dimethyl sulfoxide), singly or as a mixture thereof for facilitating the diffusion of the ion of the negative electrode material.

The ratio of the organic solvent/the high polymer solid electrolyte is in the range of, preferably 0.01 to 10, more preferably 0.1 to 5, and particularly preferably 0.5 to 3, by weight.

When the electron conductive high polymer of this invention is obtained as a powder or a massive form, the laminated electric conductive material can be formed by laminating under pressure a film formed by press molding the electron conductive high polymer on a high polymer solid electrolyte film. Also, when the electron conductive high polymer of this invention is obtained as a dispersion the dispersion is coated on a high polymer solid electrolyte film by a known coating method such as a roller coating method, a spin coating method, a casting coating method, a dip coating method, a spray coating method, an extrusion coating method, etc., and dried by a known drying method.

Furthermore, the electron conductive high polymer of this invention can be used for a battery by laminating it on an electrolyte layer containing a salt of a metal ion of group Ia or IIa of long form of the periodic table.

The electrolyte layer has a thickness of, preferably from 0.1 to 500 $\mu$m, more preferably from 0.1 to 200 $\mu$m, and particularly preferably from 0.1 to 100 $\mu$m.

The foregoing laminating layer materials may be laminated after separately forming each component, or after coating or laminating under pressure a positive electrode material on a separator, a negative electrode may be laminated thereon.

It is preferable that the separator may be impregnated with an organic solvent (e.g., propylene carbonate, ethylene carbonate, $\gamma$-butyrolactone, dimethoxyethane, methyltetrahydrofuran, acetonitrile, 1,3-dioxolan, nitromethane, dimethylformamide, and dimethyl sulfoxide) single or as a mixture thereof for facilitating the diffusion of the ion (e.g , Li+) of the negative electrode material.

The foregoing organic solvent may contain a lithium salt. Examples of the lithium salt are $LiBF_4$, $LiClO_4$, $LiCF_3SO_3$, $LiPF_6$, and lithium toluenesulfonate.

The concentration of the lithium salt is in the range of, preferably 0.01 to 10 mol/liter, more preferably 0.1 to 5 mol/liter, and particularly preferably 0.5 to 3 mol/liter.

As a material for the separator, polyolefins, polyesters, polyvinyl chloride, fluorine resins, polyamide, polysulfone, celluloses, polyurethane, glass fibers, etc., can be used.

Also, when the electron conductive high polymer of this invention is used for a battery, the oxides, sulfides, or selenides of manganese, molybdenum, vanadium, titanium, chromium, niobium, cobalt, nickel, etc.; active carbon (as described in JP-A-60-167280), carbon fibers (as described JP-A-61-10882), polyaniline, an amino group-substituted aromatic polymer, a heterocyclic polymer, polyacene, a polyyne compound, etc., can be used together as the positive electrode active material. In these materials, active carbon, $\gamma$-$MnO_2$ (described in JP-A-62-108455 and JP-A-62-108457), a mixture of $\gamma$-$\beta$-$MnO_2$ and $Li_2MnO_3$ (described in U.S. Pat. No. 4,758,484), amorphous $V_2O_5$ (described in JP-A-61-200667), $V_6O_{13}$, $Li_xNi_yCo_{1-y}O_2$ ($0.05 \leq x \leq 1.10$, $0 \leq y \leq 1$) (described in JP-A-1-294372), $MoS_2$ (JP A-61-64083), $TiS_2$ (JP-A-62-222578), polyaniline (described in JP-A-60-65031, JP-A-60-149628, JP-A-61-281128, JP-A-61-258831, JP-A-62-90878, JP-A-62-93868, JP-A-62-119231, JP-A-62-181334, and JP-A-63-46223), polyacetylene (described in JP-A-57-121168, JP-A-57-123659, JP-A-58-40781, JP-A-60-124370, JP-A-60-127669, and JP-A-61-285678), and polyphenylene are particularly effective.

The electrode active material can contain an electric conductive material such as carbon, silver (described in JP-A-63-148554), a polyphenylene derivative (described in JP-A-59-20971), etc., and a cementing agent such as Teflon, etc.

The electric conductive material or the cementing material can be used in an amount of, preferably not more than 20%, more preferably not more than 15%, and particularly preferably not more than 10%, based on the weight of the positive electrode active material.

As a negative electrode active material, metallic lithium, polyacene, polyacetylene, polyphenylene, carbon (described in JP-A-1-204361), and lithium alloys such as lithium alloys of aluminum or magnesium (described in JP-A-57-65670 and JP-A-57-98977), lithium alloys of mercury (described in JP-A-58-111265), lithium alloys of Pt, etc. (described in JP-A-60-79670), lithium alloys of Sn-Ni (described in JP-A-60-86759), Wood alloys (described in JP-A-60-167279), lithium alloys with an electric conductive polymer (described in JP-A-60-262351), lithium alloys of Pd-Cd-Bi (described in JP-A-61-29069), lithium alloys of Ga-In (described in JP-A-61-66368), lithium alloys of Pd-Mg, etc. (described in JP-A-61-66370), lithium alloys of Zn, etc. (described in JP-A-61-68864), lithium alloys of Al-Ag, etc. (described in JP-A-61-74258), lithium alloys of Cd-Sn, etc. (described in JP-A-61-91864), lithium alloys of Al-Ni, etc. (described in JP-A-62-119865 and JP-A-62-119866), lithium alloys of Al-Mn, etc. (described in U.S. Pat. No. 4,820,599), etc., are used. In these materials, lithium metal, lithium alloys of Al, and carbon are effectively used.

The ratio of the positive electrode active material/the negative electrode active material is in the range of, preferably 0.01 to 10, more preferably 0.05 to 5, and particularly preferably 0.05 to 2, by mol.

Then, this invention is further explained by referring to the following examples but this invention is not limited to these example within the scope of this invention. In these examples, all percents are by weight unless otherwise indicated.

EXAMPLE 1

Synthesis of Compound I-1 (2-Oxo-1,3-dioxolan-4-yl)

In 500 ml of a mixed solution of ethyl ether and dimethyl sulfoxide (2/1 by volume ratio) were dissolved 40 g of methyl acrylate and 45 g of tosylmethyl isocyanide and the solution was added dropwise to a mixture of 100 ml of ethyl ether and 12 g of 60% sodium hydride at 15° C. under a nitrogen gas atmosphere over a period of 15 minutes. Then, after raising the reaction temperature to 40° C., the resultant mixture was further stirred for 15 minutes. Thereafter 700 ml of ethyl ether was added thereto and the mixture was washed thrice with 200 ml of water. Then, the ether layer formed was collected, dried with anhydrous magnesium sulfate, and after distilling off ether therefrom under reduced pressure, the residue was purified by silica gel column chromatography to provide 17 g of liquid compound I-1. The product was confirmed to be compound I-1 by the following elemental analysis and H-NMR (nuclear magnetic resonance).

| Elemental Analysis for C₉H₉O₅N | | | |
|---|---|---|---|
| | C | H | N |
| Found: | 51.26% | 4.44% | 6.51% |
| Calculated: | 51.18% | 4.30% | 6.63% |

H-NMR (CDCl₃) 4.20 to 4.70 ppm (4H, m), 4.90 to 5.10 ppm (1H, m), 6.55 to 6.65 ppm (1H, m), 6.75 to 6.85 ppm (1H, m), 7.35 to 7.45 ppm (1H, m).

EXAMPLE 2

In 500 ml of acetonitrile were dissolved 6 g of compound I-1 and 1.8 g of pyrrole and the solution was ice-cooled. While stirring the solution vigorously, a solution of 80 g of ferric chloride dissolved in 100 ml of acetonitrile was added dropwise to the solution keeping the temperature thereof below 5° C. over a period of one hour. After further stirring the mixture for 4 hours while keeping the temperature thereof below 5° C., black precipitates formed were collected by filtration. The black solids were washed with 100 ml of propylene carbonate and then 500 ml of acetonitrile to provide 3.1 g of a product (P-1 polymer).

The surface area of the product measured by using BET method (as described in JIS Z 8830) was 8.5 m²/g. Also, the particle sizes thereof measured using an electron microscope were from 1 μm to 800 μm and the mean particle size thereof was 100 μm. Also, when pellets were prepared using P-1 polymer thus prepared and the electric conductivity thereof measured by a four terminal method (at 20° C., using Loresta AP, MCP-T400 manufactured by Mitsubishi Petrochemical Co., Ltd.) was $2.1 \times 10^{-1}$ s/cm.

EXAMPLES 3 TO 11

The measurement as in Example 2 was followed using compound P-2, P-3, P-4, P-6, P-7, P-8, P-9, P-11, or P-12. The results obtained are shown in Table 1.

EXAMPLE 12

Compound P-2 was ground using an agate mortar (P-A polymer). The specific area and the electric conductivity of P-A polymer are shown in Table 1.

TABLE 1

| Example | Polymer No. | Specific Area (m²/g) | Electric Conductivity (s/cm) |
|---|---|---|---|
| 2 | P-1 | 8.5 | $2.1 \times 10^{-1}$ |
| 3 | P-2 | 7.4 | $5.9 \times 10^{-1}$ |
| 4 | P-3 | 6.9 | $7.1 \times 10^{-1}$ |
| 5 | P-4 | 8.9 | $1.6 \times 10^{-1}$ |
| 6 | P-6 | 8.6 | $1.5 \times 10^{-1}$ |
| 7 | P-7 | 7.1 | $6.3 \times 10^{-1}$ |
| 8 | P-8 | 7.3 | $1.3 \times 10^{-1}$ |
| 9 | P-9 | 6.7 | $5.4 \times 10^{-1}$ |
| 10 | P-11 | 7.4 | $1.8 \times 10^{-1}$ |
| 11 | P-12 | 6.5 | $6.2 \times 10^{-1}$ |
| 12 | P-A | 6.20 | $6.1 \times 10^{-1}$ |
| Comparison Example 1 | C-1 | 6.0 | $1.1 \times 10^{-1}$ |
| Comparison Example 2 | C-2 | 5.3 | $7.2 \times 10^{-4}$ |
| Comparison Example 3 | C-3 | 0.07 | $1.7 \times 10^{-1}$ |

EXAMPLE 13

By press molding a mixture of 300 mg of P-1 polymer, 20 mg of acetylene black, and 20 mg of Teflon, pellets were formed. In this case, the density of the pellet was 1.62 g/cm³.

A battery shown in FIG. 1 was prepared using the pellets as the positive electrode active material 1, lithium metal as the negative electrode active material 3, and 250 μl of a mixture of propylene carbonate and dimethoxyethane (1:1 by volume ratio) containing 1 mol/liter of LiBF₄ as an electrolyte.

In addition, in FIG. 1, numeral 2 is a nonwoven fabric impregnated with the electrolyte solution, 4 is a stainless steel case, and 5 is an insulating synthetic rubber.

Using the battery, charging and discharging were carried out between 2.6 volts and 3.5 volts at 20° C. The discharging capacity at the 10th cycle and the 200th cycle are shown in Table 2 below.

EXAMPLES 14 TO 17

The same procedure as Example 13 was followed except that P-1 polymer was changed as shown in Table 2. The compounds used and the results are shown in Table 2.

TABLE 2

| Example | Polymer No. | Capacity (mAh) 10th Cycle | Capacity (mAh) 200th Cycle |
|---|---|---|---|
| 13 | P-1 | 12.4 | 11.9 |
| 14 | P-3 | 11.6 | 10.7 |
| 15 | P-4 | 13.7 | 12.1 |
| 16 | P-7 | 11.8 | 11.5 |
| 17 | P-10 | 11.3 | 10.5 |
| Comparison Example 1 | C-1 | 4.9 | 4.0 |
| Comparison Example 2 | C-2 | 8.2 | 3.8 |
| Comparison Example 3 | C-3 | 5.1 | 4.3 |

COMPARISON EXAMPLE 1

By carrying out the same polymerization as in Example 2 using 10 g of pyrrole, a black product C-1 was obtained. The specific area and the electric conductivity of C-1 polymer are shown in Table 1 above. Also, the same experiment as Example 13 was followed using C-1 polymer and the result is shown in Table 2 above.

COMPARISON EXAMPLE 2

By carrying out the same polymerization as Example 2 using 10 g of N-position PEO polymer (Compound A) shown below, black product C-2 was obtained. The specific area and the electric conductivity of C-2 polymer are shown in Table 1 above. Also, the same experiment as Example 13 was followed using C-2 polymer and the result obtained is shown in Table 2 above.

Compound A:

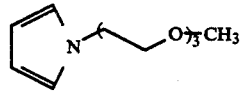

COMPARISON EXAMPLE 3

In 500 ml of a mixture of acetonitrile and water (1:1 by volume ratio) were dissolved 1.7 g of Compound I-1 and 5 g of pyrrole and the solution was kept at 60° C. While stirring the solution vigorously, a solution of 30 g of ammonium persulfate dissolved in 200 ml of water was gradually added dropwise to the solution. Black precipitates thus formed were collected and washed as in Example 1 to provide 2.9 g of product C-3. The specific area and the electric conductivity of C-3 polymer are shown in Table 1 above. Also, the same experiment as Example 13 was followed using C-3 polymer and the result obtained is shown in Table 2 above.

As is clear from the results shown above, it can be seen that the electron conductive high polymers of this invention are excellent in capacity and repeating characteristics.

While the invention has been described in detail and with reference to specific embodiments thereof, it will be apparent to one skilled in the art that various changes and modifications can be made therein without departing from the spirit and scope thereof.

What is claimed is:

1. An electron conductive high polymer comprising a repeating unit represented by following formula (1):

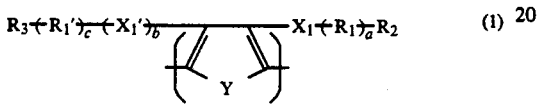

wherein $X_1$ and $X_{1'}$ each independently represents a divalent linkage group selected from the group consisting of —C(O)O—, —C(O)NR$_5$—, —CH$_2$O—, —(O)S(O)—, —C(O), and —C(O)CH$_2$O—, wherein R$_5$ represents a hydrogen atom or an alkyl group having from 1 to 3 carbon atoms; $R_1$ and $R_{1'}$ each represents an alkylene group; $R_2$ represents a cyclic ester derivative group, an acyclic ester derivative group, a cyclic ether derivative group, or a sulfone derivative group; $R_3$ represents a hydrogen atom, an alkyl group, an aryl group, a cyclic ester derivative group, an acyclic ester derivative group, a cyclic ether derivative group, or a sulfone derivative group; a, b, and c each represents 0 or 1; and Y represents —NR$_4$—, —O—, —S—, —Te—, or —Se—, wherein R$_4$ represents a hydrogen atom, an alkyl group, or an aryl group.

2. The electron conductive high polymer of claim 1, wherein the high polymer further has at least another repeating unit derived from a compound represented by following formula (2) copolymerized with said repeating unit of formula (1):

wherein $R_7$ and $R_8$ each represents a hydrogen atom, an aryl group having from 6 to 12 carbon atoms, or an alkyl group having from 1 to 10 carbon atoms; and Z represents a group containing a heteroatom.

3. The electron conductive high polymer of claim 1, wherein the high polymer is obtained by reacting said repeating unit represented by formula (1) with an oxidizing agent in a solution.

4. The electron conductive high polymer of claim 1, wherein the high polymer is obtained by an electrolytic oxidation polymerization.

5. The electron conductive high polymer of claim 1, wherein the specific area of the high polymer is from 0.1 m$^2$/g to 1,000 m$^2$/g.

6. The electron conductive high polymer of claim 2, wherein R$_2$ is selected from the group consisting of

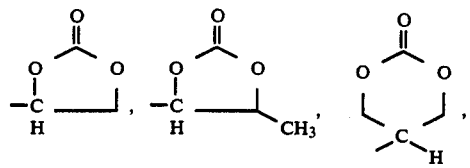

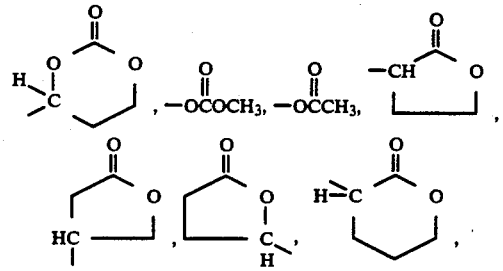

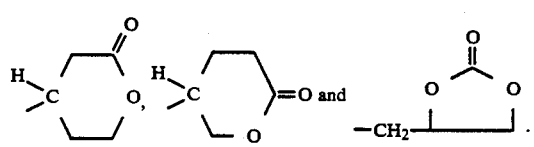

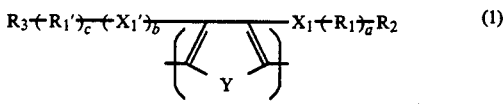

7. A positive electrode for a battery comprising an electron conductive high polymer comprising a repeating unit represented by following formula (1):

wherein $X_1$ and $X_{1'}$ each independently represents a divalent linkage group selected from the group consisting of —C(O)O—, —C(O)NR$_5$—, —CH$_2$O—, —(O)S(O)—, —C(O), and —C(O)CH$_2$O—, wherein R$_5$ represents a hydrogen atoms or an alkyl group having from 1 to 3 carbon atoms; $R_1$ and $R_1'$ each represents an alkylene group; $R_2$ represents a cyclic ester derivative group, an acyclic ester derivative group, a cyclic ether derivative group, or a sulfone derivative group; $R_3$ represents a hydrogen atom, an alkyl group, an aryl group, a cyclic ester derivative group, an acyclic ester derivative group, a cyclic ether derivative group, or a sulfone derivative group; a, b, and c each represents 0 or 1; and I represents —NR$_4$—, —O—, —S—, —Te—, or —Se—, wherein R$_4$ represents a hydrogen atom, an alkyl group, or an aryl group.

8. The positive electrode of claim 7, the electron conductive high polymer of claim 1, wherein the high polymer further has at least another repeating unit derived from a compound represented by following formula (2) copolymerized with said repeating unit of formula (1):

wherein $R_7$ and $R_8$ each represents a hydrogen atom, an aryl group having from 6 to 12 carbon atoms, or an akyl group having from 1 to 10 carbon atoms; and Z represents a group containing a hetero-atom.

9. The positive electrode of claim 7, wherein the high polymer is obtained by reacting said repeating unit represented by formula (1) with an oxidizing agent in a solution.

10. The positive electrode of claim 7, wherein the high polymer is obtained by an electrolytic oxidation polymerization.

11. The positive electrode of claim 7, wherein the specific area of the high polymer is from 0.1 m²/g to 1,000 m²/g.

12. The positive electrode of claim 7, wherein $R_2$ is selected from the group consisting of

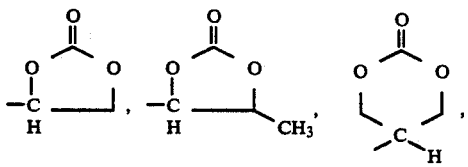

-continued

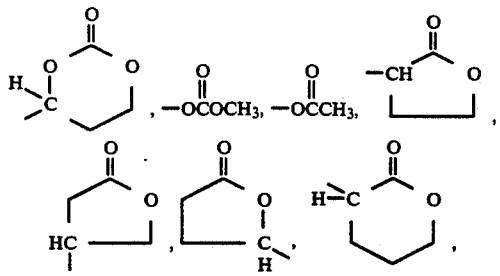

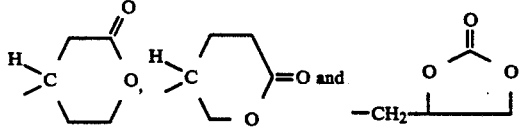

* * * * *